(12) United States Patent
Zhang et al.

(10) Patent No.: US 12,545,161 B2
(45) Date of Patent: Feb. 10, 2026

(54) SEAT ASSEMBLY, TRIM COVER ASSEMBLY, AND METHOD OF ASSEMBLING

(71) Applicant: Lear Corporation, Southfield, MI (US)

(72) Inventors: Huaying Zhang, Shanghai (CN); Jiajun Li, Shanghai (CN); Yong Yang, Shanghai (CN); Chandrashekar Simha, Shanghai (CN)

(73) Assignee: Lear Corporation, Southfield, MI (US)

( * ) Notice: Subject to any disclaimer, the term of this patent is extended or adjusted under 35 U.S.C. 154(b) by 200 days.

(21) Appl. No.: 18/236,210

(22) Filed: Aug. 21, 2023

(65) Prior Publication Data

US 2024/0166105 A1 May 23, 2024

(30) Foreign Application Priority Data

Nov. 17, 2022 (CN) .......................... 202211440958.3

(51) Int. Cl.
*B60N 2/58* (2006.01)
*A47C 7/24* (2006.01)
*A47C 31/02* (2006.01)

(52) U.S. Cl.
CPC .................. *B60N 2/5883* (2013.01)

(58) Field of Classification Search
CPC ...... B60N 2/5825; B60N 2/5833; B60N 2/58; B60N 2/5816
See application file for complete search history.

(56) References Cited

U.S. PATENT DOCUMENTS

| 5,442,818 | A | * | 8/1995 | Loos | ......................... B32B 7/12 2/164 |
| 5,669,670 | A | * | 9/1997 | Haraguchi | ............ B29C 44/141 297/219.1 |
| 5,733,001 | A | * | 3/1998 | Roberts | ................ B60N 2/5825 24/297 |
| 6,578,911 | B2 | * | 6/2003 | Harada | ................. B60R 21/207 280/730.2 |
| 6,609,752 | B2 | * | 8/2003 | Inoue | .................. B60R 21/0154 200/85 A |
| 6,733,072 | B2 | * | 5/2004 | Jaillet | .................. B60N 2/0034 297/180.12 |
| 7,287,305 | B2 | * | 10/2007 | Bednarski | ............ B60N 2/5825 24/297 |
| 7,401,829 | B2 | * | 7/2008 | Michalski | ............... B60R 13/02 112/419 |

(Continued)

*Primary Examiner* — Shin H Kim
(74) *Attorney, Agent, or Firm* — Brooks Kushman P.C.

(57) ABSTRACT

The application relates to a seat assembly, a trim cover assembly, and a method of assembling. An assembly is provided with a seat member comprising a seating surface with a groove, a first trim layer, a second trim layer attached to the first trim layer, and one or more retaining members attached to the second trim layer. The second trim layer is positioned between the first trim layer and the one or more retaining members. The one or more retaining members are received within the groove, with the one or more retaining members connecting the first trim layer to the seat member. A trim cover assembly, and a method are also provided. In various non-limiting examples, the trim assembly may provide the desired shape of the seat, maintain durability and appearance, prevent looseness, and conceal the attachment of the retaining member.

20 Claims, 3 Drawing Sheets

(56) References Cited

U.S. PATENT DOCUMENTS

| | | | | |
|---|---|---|---|---|
| 7,448,643 B2* | 11/2008 | Kuettner | | D05B 23/00 |
| | | | | 280/730.2 |
| 7,823,980 B2* | 11/2010 | Niwa | | B60N 2/5891 |
| | | | | 297/452.61 |
| 8,176,863 B2* | 5/2012 | Evans | | B60R 21/207 |
| | | | | 112/475.08 |
| 8,191,971 B2 | 6/2012 | Lovasz | | |
| 8,197,010 B2 | 6/2012 | Galbreath et al. | | |
| 8,701,816 B2* | 4/2014 | Saitoh | | B60N 2/002 |
| | | | | 177/144 |
| 8,910,583 B2* | 12/2014 | Matsushima | | A44B 19/406 |
| | | | | 112/475.04 |
| 8,998,310 B2 | 4/2015 | Lovasz et al. | | |
| 9,062,401 B2* | 6/2015 | Matsushima | | A41H 37/003 |
| 9,199,564 B2 | 12/2015 | Clauser et al. | | |
| 9,315,132 B2* | 4/2016 | Mabashi | | B60N 2/5685 |
| 10,576,853 B2* | 3/2020 | Marques | | B60N 2/5891 |
| 10,625,645 B2* | 4/2020 | Baisch | | B60N 2/7017 |
| 2002/0063452 A1* | 5/2002 | Harada | | B60R 21/207 |
| | | | | 297/216.13 |
| 2002/0093236 A1* | 7/2002 | Inoue | | B60N 2/0034 |
| | | | | 297/217.3 |
| 2002/0094411 A1* | 7/2002 | Weiss | | A41D 27/08 |
| | | | | 428/102 |
| 2002/0101109 A1* | 8/2002 | Stiller | | B60N 2/5825 |
| | | | | 297/452.6 |
| 2005/0156412 A1* | 7/2005 | Panagos | | B60R 21/207 |
| | | | | 280/730.2 |
| 2006/0113762 A1* | 6/2006 | Tracht | | B60R 21/2176 |
| | | | | 280/730.2 |
| 2006/0113763 A1* | 6/2006 | Tracht | | B60R 21/207 |
| | | | | 280/730.2 |
| 2006/0113771 A1* | 6/2006 | Tracht | | B60R 21/207 |
| | | | | 280/730.2 |
| 2007/0035165 A1 | 2/2007 | Zahel | | |
| 2009/0152909 A1 | 6/2009 | Andersson | | |
| 2014/0300172 A1* | 10/2014 | Mabashi | | B60N 2/646 |
| | | | | 297/452.58 |
| 2018/0334066 A1* | 11/2018 | Marques | | B60N 2/7017 |
| 2021/0146813 A1 | 5/2021 | Marqués et al. | | |

\* cited by examiner

SEAT ASSEMBLY, TRIM COVER ASSEMBLY, AND METHOD OF ASSEMBLING

CROSS-REFERENCE TO RELATED APPLICATIONS

This application claims foreign priority benefits under 35 U.S.C. § 119(a)-(d) to CN application number 2022 114 409 583, filed Nov. 17, 2022, which is incorporated by reference in its entirety.

TECHNICAL FIELD

Various embodiments relate to a trim assembly for a vehicle seat assembly, and a method of forming the trim assembly.

BACKGROUND

A vehicle seat assembly may be provided with a trim assembly. Examples of a trim assembly and vehicle seat assembly may be found in U.S. Patent Publication No. 2007/0035165 A1, U.S. Patent Publication No. 2009/0152909 A1, U.S. Patent Publication No. 2021/0146813 A1, U.S. Pat. Nos. 9,199,564, 8,998,310, 8,191,971, and 8,197,010.

SUMMARY

In an embodiment, an assembly is provided with a seat member comprising a seating surface, with the seating surface defining a groove extending at least partially across the seat member. A first trim layer is provided with a first surface and a second surface opposite to the first surface, with the second surface facing the seat member. A second trim layer is attached to the second surface of the first trim layer. One or more retaining members are attached to the second trim layer, with the second trim layer positioned between the first trim layer and the one or more retaining members. The one or more retaining members are received within the groove, with the one or more retaining members connecting the first trim layer to the seat member.

According to a further embodiment, the retaining member extends outwardly from the second trim layer to a distal end, the distal end received within the groove in the seat member. The assembly further comprises one or more fasteners connecting the distal end of the retaining member to the seat member within the groove.

According to another further embodiment, the retaining member is attached to the second trim layer via a seam sewn through the second trim layer and the retaining member.

According to a further embodiment, the first trim layer is attached to the second trim layer via lamination.

According to another further embodiment, the first trim layer comprises a first shape with a first outer perimeter, and the second trim layer comprises the first shape with the first outer perimeter such that the first trim layer overlays the second trim layer.

According to a further embodiment, a third trim layer is positioned between the first trim layer and the second trim layer.

According to a yet further embodiment, the third trim layer is laminated to each of the first and second trim layers.

According to another yet further embodiment, the third trim layer comprises at least one of a nonwoven fabric, a spacer fabric, and a foam.

According to another further embodiment, the second trim layer comprises at least one of a nonwoven fabric, a spacer fabric, and a foam.

According to a further embodiment, the first trim layer further comprises at least one of a leather, a leatherette, a vinyl, a knitted fabric, a woven fabric.

According to another further embodiment, the first trim layer further comprises one or more trim panels, each trim panel comprising an associated edge region, and the retaining member is attached to one of the trim panels and spaced apart from the associated edge region thereof.

According to another embodiment, an assembly is provided with a first trim layer, and a second trim layer layered onto the first trim layer and laminated thereto, with the second trim layer defining a peripheral edge region. One or more retaining members are directly attached to only the second trim layer and extending outwardly therefrom to an associated distal end, with the second trim layer positioned between the first trim layer and the retaining member and spaced apart from the peripheral edge region of the second trim layer.

According to a further embodiment, a third trim layer is layered onto the first trim layer and laminated thereto, with the first trim layer positioned between the second and third trim layers.

According to another further embodiment, the retaining member is attached to the first trim layer via a seam.

According to an embodiment, a retaining member is connected to only a first trim layer such that the retaining member extends outwardly from a first surface of the first trim layer to a distal end thereof, with the retaining member positioned to be spaced apart from a peripheral edge region of the first trim layer. A second trim layer is layered onto a second surface of the first trim layer. The first trim layer is laminated to the second trim layer.

According to a further embodiment, a third trim layer is layered onto a surface of the second trim layer such that the second trim layer is positioned between the first and third trim layers. The third trim layer is laminated to the second trim layer.

According to another further embodiment, the retaining member is connected to a seat member to retain the first and second trim layers thereto and cover the seat member.

According to a yet further embodiment, the distal end of the retaining member is positioned into a groove formed by the seat member.

According to a further embodiment, the retaining member is attached to the first trim layer via a seam.

According to another further embodiment, the second trim layer is formed with a portion of an outer perimeter that overlays a portion of an outer perimeter of the first trim layer when the second trim layer is layered onto the second surface of the first trim layer.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first trim member could be termed a second trim member, and, similarly, a second trim member could be termed a first trim member, without departing from the scope of the various described embodiments. The first trim member and the second trim member are both trim members, but they are not the same trim member.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
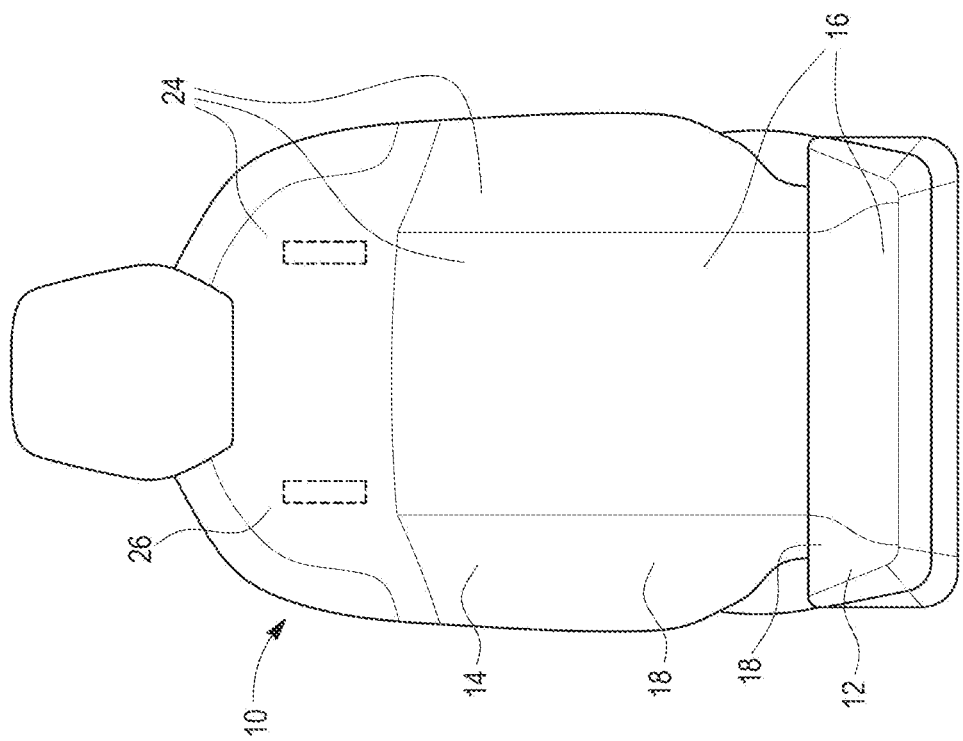
FIG. 1 illustrates a perspective view of a vehicle seat assembly according to an embodiment.

FIG. 1 illustrates a seat assembly 10, such as a vehicle seat assembly 10. In various examples, the seat assembly 10 may be shaped and sized as a front row driver or passenger seat, a second, third, or other rear row seat, and may include bench-style seats as shown, bucket seats, or other seat styles. Furthermore, the seat assembly may be a non-stowable seat or a stowable seat that may be foldable and stowable in a cavity in the vehicle floor. Additionally, the seat assembly 10 may be configured for use with other non-vehicle applications.

The seat assembly 10 has first and second seat members 12, 14, such as a seat base 12 and a seat back 14, respectively, that cooperate to form a seating surface 16 for a vehicle occupant. The seat members 12, 14 may each be supported via a support surface that is provided by a frame and/or a substrate, which may be formed from stamped steel alloy, a fiber reinforced polymer, or any suitable structural material. The seat base 12 may be sized to receive a seated occupant to support a pelvis and thighs of the occupant. The seat back 14 may be sized to extend upright from the seat bottom 12 to support a back of the occupant. The seat assembly may additionally have a head restraint (not shown). The seat base 12 and the seat back 14 may be moveable relative to one another to provide adjustments for the seat assembly.

The vehicle seat assembly 10 of FIG. 1 is illustrated as being covered with trim cover assembly 18. The trim assembly 18 provides the trim surface, or visible surface or A surface of the seat assembly 10.

Figure 2:
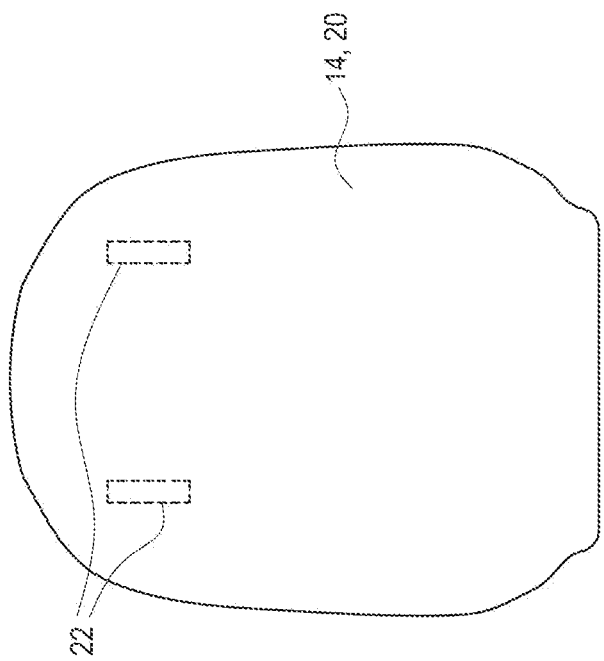
FIG. 2 illustrates a seat member for use with the vehicle seat assembly of FIG. 1 according to an embodiment.

FIG. 2 illustrates a seat member or cushion for use with the seat assembly 10 of FIG. 1 by way of example, and in the example shown, the seat member is a seat back 14, and is illustrated as being uncovered or without the trim cover assembly 18. The disclosure may likewise be applied to a seat base 12. Each of the seat members 12, 14 include a substrate or frame structure, cushion 20, and trim covering.

As shown in FIG. 2, the seat member 14 includes a cushion 20. In one example, the cushion 20 is provided by a foam material, such as a molded urethane foam, or the like. In other examples, other cushion materials are provided. The cushion 20 may be provided with one or more grooves 22 extending on the seating surface side of the cushion and seat member. The grooves 22 may each extend longitudinally along the seat member as shown, transversely across the seat member, in another direction, or a combination thereof. Furthermore, the grooves may be linear, curved, and/or another shape. In the non-limiting example shown in FIG. 2, the cushion 20 has two grooves 22 that each extend longitudinally on the seat member and are spaced apart from one another. In other examples, the grooves may each extend transversely, one groove may extend transversely with the other extending longitudinally, or more than two grooves may be provided. In various non-limiting examples, the grooves 22 may be positioned to be underneath or underlying a central region of a panel of the trim cover assembly or away from a seam or other join between two panels of the seat assembly.

Figure 3:
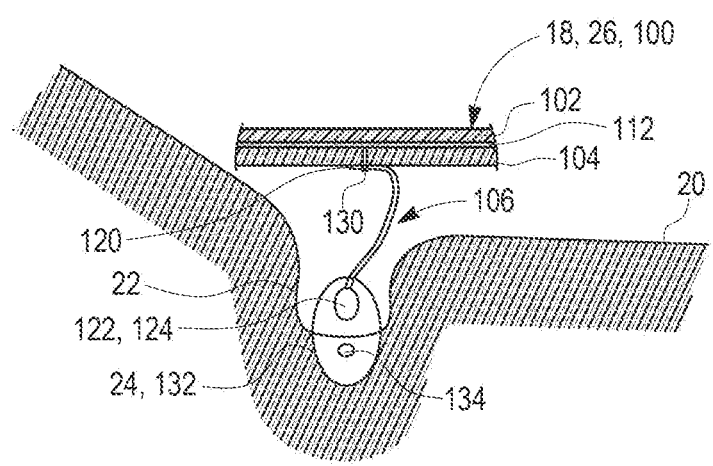
FIG. 3 illustrates a partial sectional view of a trim cover assembly and the seat member of FIGS. 1-2 according to an embodiment.

The trim cover assembly 18 may be provided by one or more assemblies or pieces that are attached to the underlying seat member 12, 14 using fastener(s), also referred to as retainer(s). The trim assemblies 18 may be fastened or anchored to the vehicle seat member 12, 14 into the grooves 22 using the fasteners. The fasteners may be provided by rings, hook and look fasteners, clip or push in fasteners, and the like. An example of a fastener 132 as a hog ring is shown in FIG. 3 by way of example only. Trim assemblies 18 according to various examples of the present disclosure and for use with a seat assembly such as seat assembly 10 are described below in greater detail.

The disclosed trim assembly 18 and method may be used with a seat back 14, a seat base 12 or both. For simplicity, a trim assembly and a method associated with the trim assembly is described with respect to use with a seat back 14 by way of example; however, the trim assembly and method may likewise be applied to use with a seat base 12, with a seat back and base in combination, or with another vehicle component or other seating device requiring a trim cover.

In the examples described herein, the trim cover assembly 18 extends over the seating surface of the seat back member 14. As such, the trim assembly 18 may extend over one or more grooves 22 in the seat member. These grooves 22 are used to anchor the trim assembly 18 to the underlying seat member 14 via retaining members as described below and prevent sagging, bagginess, looseness, floating, tenting, or the like of the trim assembly 18 as it extends over a large surface area or over a surface area with concavity or other curvature. Additionally, the trim assembly 18 may be retained to and conform to the underlying surface of the cushion 20 via the retaining members over extended periods of time and use, e.g. with loads induced on the trim cover assembly by seat occupant ingress and egress, or by seat functions that may move or stretch the trim cover assembly such as massage, lumbar adjust, bolster adjust, cushion lift up, upper back adjust, and the like. The trim cover assembly 18 is illustrated as being formed from multiple panels 24 that are sewn or otherwise connected to one another.

Figure 4:
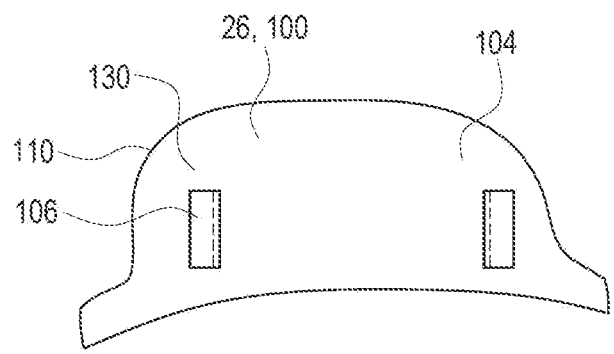
FIG. 4 illustrates a back view of the trim cover assembly.

FIGS. 3-4 illustrates a back view of a trim cover assembly 100, and a sectional view of a cushion 20 and trim cover assembly 100 according to one example. The front view of the trim assembly 100 is shown by way of example in FIG. 1. The trim cover assembly 100 may be used as the trim cover assembly 18 as shown in FIG. 1, and with the cushion 20 as shown in FIG. 2.

The trim cover assembly 100 may be formed from one or more trim panels 24, each having an associated edge region, or peripheral edge region. The trim panels may be connected to one another at their associated edge regions, e.g. via sewing or another technique. A single trim panel is shown in FIG. 3, such as trim panel 26. Other trim panels in the trim cover assembly 100 may be similar to the panel as described herein, or may have greater or fewer layers, or other retaining members.

The trim cover assembly 100 has a first trim layer 102 and a second trim layer 104, and one or more retaining members 106 attached to the second trim layer 104. The second trim layer 104 is positioned between the first trim layer 102 and the one or more retaining members 106. Although FIG. 3 illustrates only one retaining member 106, the trim cover assembly 100 may have any number of retaining members, including two or more retaining members 106. Furthermore, the trim cover assembly 100 may have a retaining member 106 that is associated with each groove 22. The retaining member 106 is attached to one of the trim panels 26 as shown, and is spaced apart from the associated edge region of the trim panel such that it is positioned in an intermediate or central region of the trim panel 26.

The first trim layer 102 comprises a first shape with a first outer perimeter 110. The second trim layer 104 comprises the first shape with the first outer perimeter 110 such that the first trim layer 102 overlays the second trim layer 104. The second trim layer 104 therefore has the same overall shape and size as the first trim layer 102 according to various non-limiting examples.

In the example shown, the first trim layer 102 is formed from a fabric, such as fabrics used in vehicle interiors, and may further be formed from leather, leatherette or faux leather, vinyl, woven cloth, non-woven cloth, knitted fabric, and the like. The first trim layer 102 may be referred to as an outer trim layer. The first trim layer 102 provides the finished surface, or A-surface for the trim assembly 100 and is an outer face for the trim assembly 100 when installed on the seat member. The first trim layer 102 has a second surface opposite to the first surface that is the inner surface and faces the cushion 20 of the seat member when installed on the seat member, and that may be in contact with the second trim layer 104.

In the example shown, the second trim layer 104 is formed from a nonwoven fabric such as fleece, a spacer fabric such as a knit or mesh spacer fabric, and/or a foam such as a urethane, polyurethane, or other foam material. In further examples, the second trim layer 104 may be formed from a sandwich of materials, such as a foam and fleece sandwich. The second trim layer 104 provides the B-surface or B-side of the trim cover assembly and faces the cushion 20. The second trim layer 104 may be referred to as a foundation layer.

The first trim layer 102 is attached to the second trim layer 104 via lamination. In one example, and as shown, the first trim layer 102 is directly connected or attached to the second trim layer 104 via lamination. The lamination process may be a heated lamination process, e.g. using a belt, or a hot melt polyurethane lamination, e.g. via a PUR process. Alternatively, the lamination process may include high frequency (HF) welding or another lamination technique. The lamination may include a layer of adhesive 112 between the layers 102, 104.

Each retaining member 106, also known as a tie down, is connected to the second trim layer 104, and extends outwardly from the second trim layer 104 from a proximal end 120 to a distal end 122. Each retaining member 106 may be directly connected to only the second trim layer 104. In various examples, the retaining members 106 are not directly attached to the first trim layer 102.

The retaining member 106 may extend lengthwise for at least a portion of the length of an associated groove 22. The distal end 122 of the retaining member 106 is received within an associated groove 22 in the seat member to connect the trim assembly 100 to the seat member 14, and such that the first trim member overlays the seat member.

The retaining member 106 may be formed from a nonwoven fabric or plastic film with a plastic or metal bead, a listing pocket and wire, and/or an elastic material. The distal end 122 of the retaining member may be provided with a bead 124 as shown that extends longitudinally along the length of the retaining member, or may be provided without a bead in other examples.

The proximal end 120 of each retaining member is attached to the second trim layer 104 via a seam 130 sewn through the second trim layer 104 and the retaining member 106. The seam 130 may be sewn through only the second trim layer 104 and the retaining member 106. In various examples, the seam 130 is not visible or apparent from the A-surface or first surface of the first trim member 104 as it does not extend through or connect to the first trim layer 102. The first trim layer 102 therefore provides the appearance of a single panel 26 without the seam 130 or other join for the retaining member 106 being visible to a seat occupant, either as a joining seam or as a decorative stitch or pattern Each retaining member 106 has one or more first fasteners 132 or retainers. The first fasteners 132 may be connected adjacent to the distal end 122 of the retaining member. Each of the first fasteners 132 is connected to one or more second fasteners 134 in the seat member. The second fasteners 134 may be embedded in or otherwise connected to the seat member and cushion 20, and may be positioned within the groove 22. In the example shown, the first fastener 132 is a hog ring, and the second fastener 134 is an embedded wire. In other examples, the first and second fasteners 132, 134 may include hook and loop fasteners, clips, T-shaped or L-shaped shims or paddles with slots or apertures, or the like. The retaining member 106 is therefore used to connect the trim cover assembly 100 to the seat member.

Figure 5:
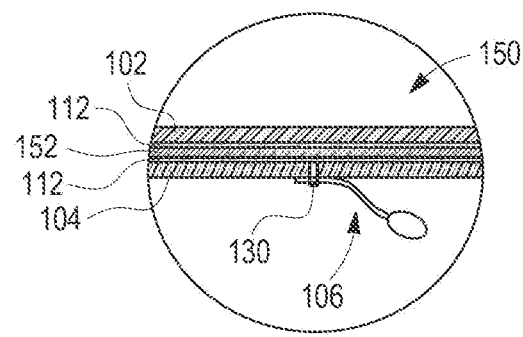
FIG. 5 illustrates a partial sectional view of a trim cover assembly according to another embodiment and for use with the vehicle seat assembly of FIG. 1.

FIG. 5 illustrates a sectional view of a trim cover assembly 150 according to another example, which furthermore may be provided as a panel 26 as described above. The trim cover assembly 150 may be used in place of trim cover assembly 100 in FIG. 3 or as the trim cover assembly 18 in FIG. 1, and with the cushion 20 of FIG. 2. Elements that are the same as or similar to those described above with respect to FIGS. 3-4 are given the same reference numbers for simplicity. The front and back views of the trim cover assembly 150 are similar to those shown above with respect to FIGS. 1 and 4. Furthermore, the description of the trim assembly 18, 100 as provided with respect to FIGS. 1-4 may be applied to the trim assembly 150 as shown in FIG. 5 as appropriate.

The trim cover assembly 150 may be provided with a third trim layer 152 positioned between the first trim layer 102 and the second trim layer 104. The third trim layer 152 is laminated to the first trim layer 102, and is laminated to the second trim layer 104. The third trim layer 152 may also be provided with the first shape with the first outer perimeter 110, such that it has the same shape and size as the first and second trim layers 102, 104 and overlays with the first and second trim layers according to various non-limiting examples.

The third trim layer 152 is formed from a nonwoven fabric such as fleece, a spacer fabric such as a knit or mesh spacer fabric, and/or a foam such as a urethane, polyurethane, or other foam material. In further examples, the third trim layer 152 may be formed from a sandwich of materials, such as a foam and fleece sandwich. The third trim layer 152 may be referred to as another foundation layer.

In the example shown with respect to FIGS. 1-5, a pair of retaining members 106 are connected to the second trim layer 104, and a pair of grooves 22 is provided in the underlying seat member as shown in FIG. 2, with each of the retaining members 106 received in an associated groove 22. In other examples, only one retaining member 106 may be provided, or more than two retaining members 106 may be provided, and the retaining members may extend in other directions based on the positioning of the grooves 22. As shown in FIGS. 1-5, the retaining members 106 are positioned to be aligned with and received within the grooves 22, while the first trim layer 102 provides a smooth, outer, continuous panel with the seams 130 connecting the retaining members 106 to the underlying layer 104 not visible to the seat occupant. The retaining members 106 are therefore used to provide an invisible tie down technique for the trim cover assembly 100 to the seat member, and conform the trim cover assembly 100 to the shape and contour of the underlying cushion 20.

A method according to the present disclosure is provided to assemble the trim assembly, and assemble the seat assembly, and may be used with the seat assembly 10 of FIG. 1, the seat members of FIG. 2, and the trim assemblies 18, 100, 150 as described herein. In various examples, various steps in the method may be omitted, added, rearranged into another order, or performed sequentially or simultaneously.

In a first step, a first trim layer 102 is formed with a portion of an outer perimeter 110 that overlays a portion of an outer perimeter of a second trim layer 104 when the second trim layer is layered onto the first trim layer. Optionally, a third trim layer 152 may be formed with a portion of an outer perimeter 110 that overlays the portion of the outer perimeter of the first and second trim layers when the third trim layer is layered thereon.

Figure 6:
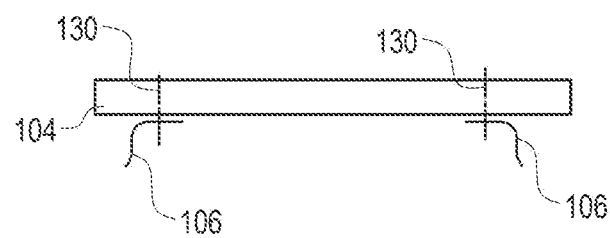
FIG. 6 illustrates a trim cover assembly during a step in a method of assembling a trim cover assembly and vehicle seat assembly according to an embodiment.

In a second step, a retaining member 106 is connected to a trim layer 104, such as the second trim layer described above, such that the retaining member 106 extends outwardly from a first surface of the trim layer to a distal end. The retaining member 106 may be positioned to be spaced apart from a peripheral edge region 110 of the trim layer 104. The retaining member 106 may be connected to the trim layer by sewing the retaining member to the trim layer to form a seam 130 that is sewn through the trim layer 104 and retaining member 106, and furthermore may be sewn only through the trim layer 104 and retaining member 106. A partially assembled trim cover assembly after the second step is shown by way of example in FIG. 6.

Figure 7:
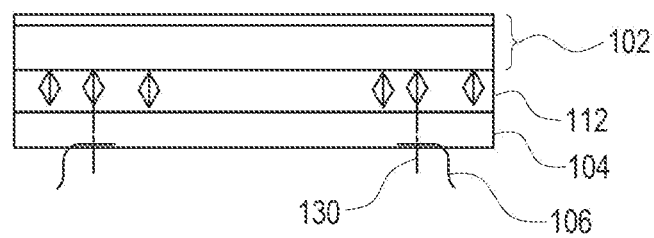
FIG. 7 illustrates a trim cover assembly during another step in a method of assembling a trim cover assembly and vehicle seat assembly according to an embodiment.

In a third step, another trim layer is layered onto a second surface of the trim layer 104, and opposite to the retaining member 106, as shown in FIG. 7. The trim layers are laminated to one another, and an adhesive 112 may be used. The another trim layer may be the first trim layer 102 as described with respect to FIG. 3, or the third trim layer 152 as described with respect to FIG. 5. A trim cover assembly during the third step is shown by way of example in FIG. 7.

In a fourth, optional step, yet another trim layer is layered and laminated to the trim cover assembly opposite to the retaining member 106 in a process similar to that shown and described in FIG. 7. The first trim layer 102 as described with respect to FIG. 5 may be layered and then laminated onto a surface of the third trim layer 152 such that the third trim layer is positioned between the first and second trim layers. The third and fourth steps may each be performed subsequently to the second step.

In a fifth step, the trim assembly 100 is positioned such that the retaining member 106 is positioned with the distal end 122 extending into a groove 22 formed in the seating surface of the seat member, e.g. into a cushion 20. The outermost trim layer 102 opposite the retaining member therefore overlays the groove 22, and may provide the appearance of an uninterrupted surface for a trim panel 26 over the groove 22.

In a sixth step, the retaining member 106 is connected to the associated seat member 12, 14 to retain the first and second trim layers 102, 104 thereto and cover the seat member 12, 14 with the trim assembly, while conforming the trim cover assembly to the underlying shape or contour of the cushion 20.

Aspect 1. An assembly is provided with a seat member comprising a seating surface, with the seating surface defining a groove extending at least partially across the seat member. A first trim layer is provided with a first surface and a second surface opposite to the first surface, with the second surface facing the seat member. A second trim layer is attached to the second surface of the first trim layer. One or more retaining members are attached to the second trim layer, with the second trim layer positioned between the first trim layer and the one or more retaining members. The one or more retaining members are received within the groove, with the one or more retaining members connecting the first trim layer to the seat member.

Aspect 2. An assembly according to any one of aspects 1 or 3-11 wherein the retaining member extends outwardly from the second trim layer to a distal end, the distal end received within the groove in the seat member. The assembly further comprises one or more fasteners connecting the distal end of the retaining member to the seat member within the groove.

Aspect 3. An assembly according to any one of aspects 1-2 or 4-11 wherein the retaining member is attached to the second trim layer via a seam sewn through the second trim layer and the retaining member.

Aspect 4. An assembly according to any one of aspects 1-3 or 5-11 wherein the first trim layer is attached to the second trim layer via lamination.

Aspect 5. An assembly according to any one of aspects 1-4 or 6-11 wherein the first trim layer comprises a first shape with a first outer perimeter, and the second trim layer comprises the first shape with the first outer perimeter such that the first trim layer overlays the second trim layer.

Aspect 6. An assembly according to any one of aspects 1-5 or 8-11 wherein a third trim layer is positioned between the first trim layer and the second trim layer.

Aspect 7. An assembly according to any one of aspects 6 or 8 wherein the third trim layer is laminated to each of the first and second trim layers.

Aspect 8. An assembly according to any one of aspects 6-7 wherein the third trim layer comprises at least one of a nonwoven fabric, a spacer fabric, and a foam.

Aspect 9. An assembly according to any one of aspects 1-8 or 10-11 wherein the second trim layer comprises at least one of a nonwoven fabric, a spacer fabric, and a foam.

Aspect 10. An assembly according to any one of aspects 1-9 or 11 wherein the first trim layer further comprises at least one of a leather, a leatherette, a vinyl, a knitted fabric, a woven fabric.

Aspect 11. An assembly according to any one of aspects 1-10 wherein the first trim layer further comprises one or more trim panels, each trim panel comprising an associated edge region, and the retaining member is attached to one of the trim panels and spaced apart from the associated edge region thereof.

Aspect 12. An assembly is provided with a first trim layer, and a second trim layer layered onto the first trim layer and laminated thereto, with the second trim layer defining a peripheral edge region. One or more retaining members are directly attached to only the second trim layer and extending outwardly therefrom to an associated distal end, with the second trim layer positioned between the first trim layer and the retaining member and spaced apart from the peripheral edge region of the second trim layer.

Aspect 13. An assembly according to any one of aspects 12 or 14 wherein a third trim layer is layered onto the first trim layer and laminated thereto, with the first trim layer positioned between the second and third trim layers.

Aspect 14. An assembly according to any one of aspects 12-13 wherein the retaining member is attached to the first trim layer via a seam.

Aspect 15. A method includes connecting a retaining member to only a first trim layer such that the retaining member extends outwardly from a first surface of the first trim layer to a distal end thereof, with the retaining member positioned to be spaced apart from a peripheral edge region of the first trim layer. A second trim layer is layered onto a second surface of the first trim layer. The first trim layer is laminated to the second trim layer.

Aspect 16. A method according to any one of aspects 15 or 17-20, wherein a third trim layer is layered onto a surface of the second trim layer such that the second trim layer is positioned between the first and third trim layers. The third trim layer is laminated to the second trim layer.

Aspect 17. A method according to any one of aspects 15-16 or 18-20, wherein the retaining member is connected to a seat member to retain the first and second trim layers thereto and cover the seat member.

Aspect 18. A method according to aspect 17 wherein the distal end of the retaining member is positioned into a groove formed by the seat member.

Aspect 19. A method according to any one of aspects 15-18 or 20, wherein the retaining member is attached to the first trim layer via a seam.

Aspect 20. A method according to any one of aspects 15-19, the second trim layer is formed with a portion of an outer perimeter that overlays a portion of an outer perimeter of the first trim layer when the second trim layer is layered onto the second surface of the first trim layer.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. An assembly, comprising:
   a seat member comprising a seat cushion, the seat cushion defining a groove extending at least partially across the seat member;
   a first trim layer comprising a first surface and a second surface opposite to the first surface, the second surface facing the seat cushion;
   a second trim layer positioned beneath the first trim layer and adhered directly to the first trim layer, the second trim layer comprising a third surface and a fourth surface, the third surface of the second trim layer is attached to the second surface of the first trim layer and the fourth surface of the second trim layer is attached to an A surface of the seat cushion; and
   one or more retaining members attached to a seam portion of the second trim layer,
   and received within the groove of the seat cushion such that the first surface of the first trim layer is visible without an appearance of the seam portion on the seat member and the first trim layer is affixed to the seat member, via the second trim layer and the one or more retaining members connecting the second trim layer to the seat cushion.

2. The assembly of claim 1, wherein the retaining member extends outwardly from the second trim layer to a distal end, the distal end received within the groove in the seat member; and
   wherein the assembly further comprises one or more fasteners connecting the distal end of the retaining member to the seat member within the groove.

3. The assembly of claim 1, wherein the one or more retaining members is attached to the second trim layer via the seam sewn through the second trim layer and the retaining member.

4. The assembly of claim 1, wherein the first trim layer is attached to the second trim layer via at least one of lamination or an adhesive.

5. The assembly of claim 1, wherein the first trim layer comprises a first shape with a first outer perimeter; and
   wherein the second trim layer comprises the first shape with the first outer perimeter such that the first trim layer overlays the second trim layer.

6. The assembly of claim 1, further comprising a third trim layer positioned between the first trim layer and the second trim layer.

7. The assembly of claim 6, wherein the third trim layer is laminated to each of the first trim layer and the second trim layer.

8. The assembly of claim 6, wherein the third trim layer comprises at least one of a nonwoven fabric, a spacer fabric, and a foam.

9. The assembly of claim 1, wherein the second trim layer comprises at least one of a nonwoven fabric, a spacer fabric, and a foam.

10. The assembly of claim 1, wherein the first trim layer further comprises at least one of a leather, a leatherette, a vinyl, a knitted fabric, a woven fabric.

11. The assembly of claim 1, wherein the first trim layer further comprises one or more trim panels, each trim panel comprising an associated edge region, wherein the retaining member is attached to one of the trim panels and spaced apart from the associated edge region thereof.

12. The assembly of claim 1, wherein the one or more retaining members comprises a first fastener and a second fastener, and wherein each of the first fastener and the second fastener comprises at least one of a hook and loop fastener, a clip, a T-shaped shim or paddle, and an L-shaped shim or paddle with slots.

13. The assembly of claim 1, wherein the one or more retaining members comprises a hog ring connected to a distal end of the one or more retaining members and a wire connected to the hog ring, and wherein the wire is embedded in the seat member via the groove.

14. An assembly, comprising:
a first trim layer comprising a first surface and a second surface;
a second trim layer layered onto the first trim layer and laminated directly to the first trim layer, the second trim layer comprising a third surface and a fourth surface, the third surface of the second trim layer is attached to the second surface of the first trim layer and the fourth surface of the second trim layer is attached to an A surface of the seat cushion, wherein the second trim layer defining a peripheral edge region; and
one or more retaining members directly attached to only the second trim layer at a seam portion and extending outwardly therefrom to an associated distal end received within a grove of a seat cushion of a seat member, the second trim layer positioned between the first trim layer and the retaining member and spaced apart from the peripheral edge region of the second trim layer, such that the first surface of the first trim layer is visible without an appearance of the seam portion on the seat member and the first trim layer is affixed to the seat member, via the second trim layer.

15. The assembly of claim 14, further comprising a third trim layer layered onto the first trim layer and laminated thereto, the first trim layer positioned between the second and third trim layers, and wherein the retaining member is attached to the first trim layer via a seam.

16. A method, comprising:
connecting a retaining member to only a first trim layer such that the retaining member extends outwardly from a first surface of the first trim layer to a distal end thereof received in a groove of a seat cushion of a seat member, the retaining member positioned to be spaced apart from a peripheral edge region of the first trim layer;
adhering a second trim layer directly onto a second surface of the first trim layer, wherein the second trim layer comprising a third surface and a fourth surface, the third surface of the second trim layer is attached to the second surface of the first trim layer and the first surface of the first trim layer is attached to an A surface of the seat cushion such that the fourth surface second trim layer is visible without an appearance of the seam portion on the seat member and the second trim layer is affixed to the seat member, via the first trim layer; and
laminating the first trim layer to the second trim layer, wherein the lamination is formed by at least one of heated lamination process or a hot melt polyurethane lamination process.

17. The method of claim 16, further comprising layering a third trim layer onto a surface of the second trim layer such that the second trim layer is positioned between the first trim layer and the third trim layer; and
laminating the third trim layer to the second trim layer.

18. The method of claim 16, further comprising connecting the retaining member to a seat member to retain the first trim layer and the second trim layer thereto and cover the seat member, and wherein the retaining member is attached to the first trim layer via a seam.

19. The method of claim 18, further comprising positioning the distal end of the retaining member into a groove formed by the seat member.

20. The method of claim 16, further comprising forming the second trim layer with a portion of an outer perimeter that overlays a portion of an outer perimeter of the first trim layer when the second trim layer is layered onto the second surface of the first trim layer.

* * * * *